United States Patent [19]
Dodt et al.

[11] Patent Number: 5,325,255
[45] Date of Patent: Jun. 28, 1994

[54] SELF IDENTIFYING UNIVERSAL DATA STORAGE ELEMENT

[75] Inventors: William C. Dodt, Broomfield; David T. Hoge, Arvada; Donovan M. Janssen, Boulder; John C. Owens, Aravada, all of Colo.

[73] Assignee: Storage Technology Corporation, Louisville, Colo.

[21] Appl. No.: 744,456

[22] Filed: Aug. 12, 1991

[51] Int. Cl.$^5$ .............................................. G11B 15/04
[52] U.S. Cl. ...................................... 360/132; 360/95
[58] Field of Search ................. 360/132, 95; 242/195, 242/197; 250/568–570

[56] References Cited

U.S. PATENT DOCUMENTS

| | | | |
|---|---|---|---|
| 4,012,011 | 3/1977 | Saito | 242/199 |
| 4,261,021 | 4/1981 | Titus, IV | 369/27 |
| 4,452,406 | 6/1984 | Richard | 242/195 |
| 4,769,732 | 9/1988 | Tanaka | 360/132 |
| 4,935,611 | 6/1990 | Yaniv | 235/487 |

FOREIGN PATENT DOCUMENTS 0040686 12/1981 European Pat. Off. .
0091171 10/1983 European Pat. Off. .
0389121 9/1992 European Pat. Off. .

Primary Examiner—Paul M. Dzierzynski
Assistant Examiner—Don Wong
Attorney, Agent, or Firm—Duft, Graziano & Forest

[57] ABSTRACT

A universal data storage element presents a data storage element of uniform form factor while enables the selection of media types to provide variable data recording characteristics. Using multiple types of media in an automated library system or a manually operated media storage retrieval system is now possible with a uniform form factor exists in all of the data storage elements. Physical characteristics of the media are identified by a plurality of coding apertures outside the data storage element. A drive element decodes and identifies the type of media from the apertures.

30 Claims, 1 Drawing Sheet

SELF IDENTIFYING UNIVERSAL DATA STORAGE ELEMENT

CROSS REFERENCE TO RELATED APPLICATIONS

This application is related to a patent application titled UNIVERSAL DATA STORAGE ELEMENT, Ser. No. 07/620,275, filed Nov. 30, 1990 now abandonment.

FIELD OF THE INVENTION

This invention relates to data storage systems and, in particular, to a data storage element form factor having substantially uniform exterior dimensions and containing media of variable type and configuration.

PROBLEM

It is problem in data processing systems to provide data storage capacity that is adaptable to the varying needs of the computer system. Existing data storage systems are inflexible, based on a single type of media that has predetermined mechanical, electrical, and operational constraints. A computer system user must therefore purchase a mixture of data storage systems to match the data storage capabilities with the nature of the data stored thereon. The selection of a data storage system also forces the user to restrict the media to a type that matches the installed data storage system. Often, the cost of additional incompatible data storage systems is prohibitive. The transition from one media to another is generally controlled by the need to change one of the primary data storage system characteristics such as volumetric efficiency of data stored per unit of space occupied, access performance (e.g. load, search, transfer times, etc.), cost, reliability, archival data storage capabilities (e.g. shelf life, environmental hardness, format standards, etc.), or management (e.g. media interchange, automated handling, catalogue systems, physical facilities, etc.).

For removable media types, the effects of such transitions are exacerbated by the use of large automated library systems. An example of these automated library systems is the 4400 Automated Cartridge System manufactured by Storage Technology Corporation, which provides economical and efficient handling of thousands of the industry standard 3480-type magnetic tape cartridges for an associated plurality of tape cartridge drive systems. An automated library system requires the user to commit to a significant investment in 3480-type tape cartridges and tape drives. The robotic media handling elements in an automated library system typically can not handle diverse types of media, since such robots are designed to handle a specific media having a specific form factor. Furthermore if it were possible to introduce different media of similar form factor, media management requires a way to identify and differentiate individual media units. Thus, while the automated library system provides tremendous data storage and data retrieval performance improvement, it has the disadvantage of constraining the user to a specific media having a specific form factor since existing removable media are unique and not interchangeable.

SOLUTION

The above described problems are solved and a technical advance achieved in the field by the self identifying universal data storage element of the present invention. Existing removable media data storage and retrieval systems, whether manual or robotic, are predicated on the use of removable data storage elements of predefined and uniform external dimensions, internal structure, media and data recording characteristics. The universal data storage element of the present invention presents a data storage element of uniform form factor but that enables the user to vary the contents to include a selection of media types. These media types are used to provide variable data storage and/or recording characteristics.

This universal data storage element also includes coding apparatus to identify the media contents of the universal data storage element. This coding apparatus enables the user to use multiple types of media in an automated library system or a manually operated media storage and retrieval system, since the form factor of all of the data storage elements contained therein is uniform. The use of the universal data storage element varies the data storage capability of the data storage element to be consistent with the data recording technique used by devices associated with either system.

In the preferred embodiment disclosed herein, the industry standard 3480-type magnetic tape cartridge form factor is used to illustrate the invention. The 3480-type magnetic tape cartridge consists of a substantially rectangular shaped exterior housing which contains a single reel of media tape, which tape media has a leader block affixed to one end. The leader block is exposed through an opening in the exterior housing of the tape cartridge, for use by an associated tape drive to retrieve the tape media from the tape cartridge. The physical characteristics of the media located within this data storage element are identified by a coding arrangement located on the exterior housing of the data storage element. A drive element can thereby decode the media type and, if compatible, access the media stored in the data storage element. The coding identifies the media type without requiring the drive element to first access the media located within the data storage element.

In the disclosed embodiment, the data storage element self identification apparatus consists of a plurality of coding holes or slots arranged in a linear array and located along one edge of the exterior housing of the data storage element. These coding holes are placed in the housing during the data storage element manufacturing process to define the type of media contained within the data storage element or various data management characteristics of this media. The drive element can therefore automatically determine whether this data storage element can be processed by simply probing the array of coding holes with a probe element, such as a photodetector or a corresponding array of decoding pins.

Thus, the use of a fixed form factor self identifying universal data storage element enables the user to equip a library system with a plurality of diverse drive elements, each requiring a different type of media. The variability of the media within the universal data storage element and the associated interface elements enables the physical handling of every data storage element in a uniform manner without the likelihood of damage to the drive elements due to the use of these coding holes in the data storage element exterior housing.

DETAILED DESCRIPTION

Existing removable media data storage and retrieval systems, whether manual or robotic, are predicated on the use of removable data storage elements of predefined and uniform external dimensions, internal structure, media and data recording characteristics. The universal data storage element of the present invention presents a uniform form factor data storage element but enables the user to vary the contents to include a selection of media types used therein to provide variable data storage and/or recording characteristics. This enables the user to use multiple types of media in an automated library system or a manually operated media storage and retrieval system, since the form factor of all of the data storage elements contained therein is uniform. Mismatch between the media contained in the data storage element and the drive element is prevented by the use of a plurality of coding holes placed on the exterior housing of the data storage element to identify the physical characteristics of the media contained therein. The drive element automatically senses the presence of a predefined pattern of these holes to determine whether the data storage element can be processed on this drive element.

Universal Data Storage Element Architecture

Figure 1:
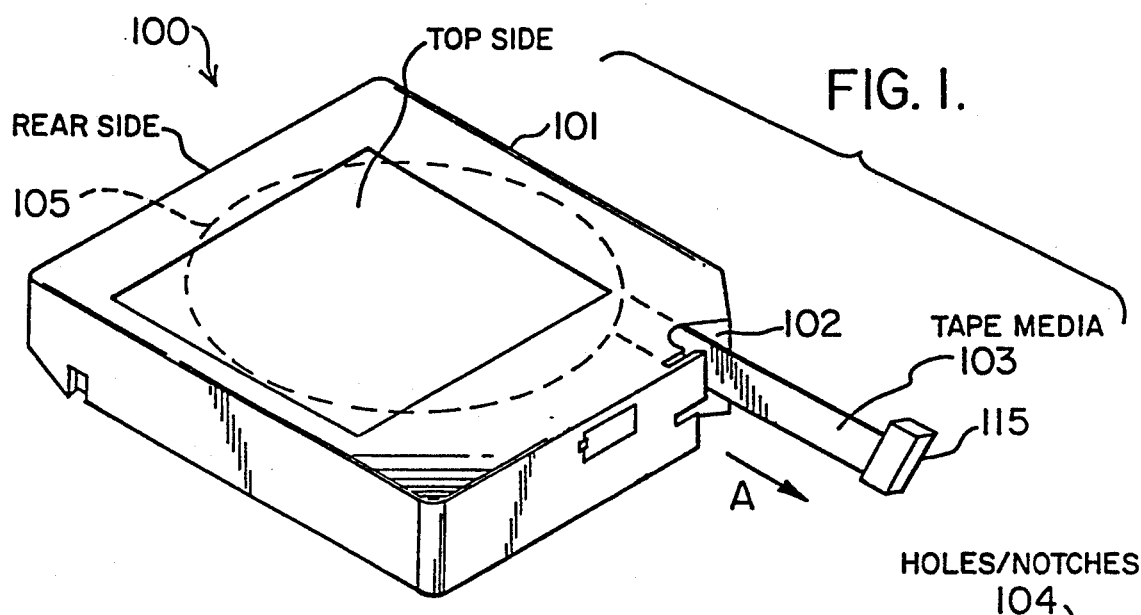
FIG. 1 illustrated the overall architecture of the universal data storage element, including one embodiment of the array of coding holes on the exterior housing of the universal data storage element.
Figure 1A:
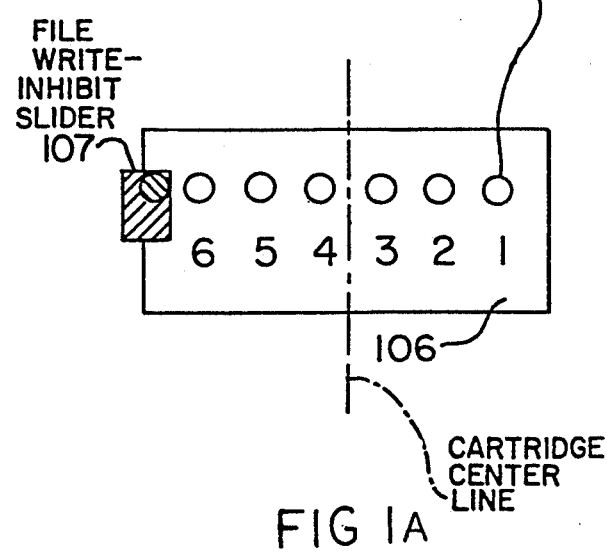
FIG. 1A illustrates a coding apparatus of the present invention.

FIG. 1 illustrates the overall architecture of the universal data storage element 100. This data storage element 100 consists of a housing 101 that substantially matches the industry standard 3480-type magnetic tape cartridge in exterior dimensions and configuration. Housing 101 includes an opening 102 in one corner therein to provide access to the media located within housing 101. Within housing 101, the universal data storage element 100 contains, for example, a reel 105 that contains a tape media 103, which reel 105 is rotatably affixed in well-known fashion to the interior walls of housing 101 on opposite facing interior walls thereof. Tape media 103 is extensible from a loaded position, wherein it is located fully within housing 101, to an extracted position, wherein all or part of tape media 103 is extracted from housing 101 and wound on a take up reel (not shown) located external to housing 101 on a drive element into which the data storage element 100 has been placed.

Media Retrieval

In order to effectuate the extraction of the tape media 103 from housing 101, a leader block 115 is used. This leader block 115 is affixed to one end of the tape media 103 wound on reel 105 to provide a mechanical point of contact for a media withdrawal element in the associated drive element. A mounting pin mechanism in the drive element receives leader block 115 and pulls the associated tape media 103 out of cartridge housing 101 by moving leader block 115 in the direction indicated by arrow A.

Media Variations and Differentiation

At present, there is only one media type loaded into the commercially available 3480-type magnetic tape cartridge: a longitudinal one-sided magnetic tape. The universal data storage element 100 uses various media types. These media types can include type of tape (magnetic or optical), data recording format (longitudinal or helical), tape dimensions (thick or thin/length of tape on reel), magnetic coating on the tape (iron-oxide or chromium dioxide or barium ferrite), write protection status, etc. There is the potential for damage to the media contained within the universal data storage element 100, or the associated drive element if the media is incompatible with the associated drive element. One method of avoiding this problem is to "encode" the universal data storage element 100 to identify the media stored therein. One encoding scheme is the use of physical or optical features on the exterior of housing 101. An example of such features is the use of a pattern of ridges 104 or indentations (such as holes or slots) located on one side of housing 101, which pattern identifies the media contained within universal data storage element 100. A corresponding coding detection apparatus, such as a photodetector or a corresponding array of decoding pins, in the drive element detects the presence and pattern of holes 104 to determine whether the media contained in this universal data storage element 100 is compatible with the associated drive element. The presence of an incompatible media would abort the loading process prior to the drive element attempting to access the media contained within.

Coding Configuration

The coding apparatus used in data storage element 100 consists of a set of coding marks 104 which are mechanically imprinted into a least one exterior surface of the housing 101. In FIG. 1, the coding marks 104 consist of a linear array comprising a plurality of holes in one exterior surface of housing 101 and, in particular, in the front face of housing 101. The plurality of coding marks 104 are located within a rectangular area 106 located, for illustrative purposes, symmetrically about the center line of the data storage element (cartridge) 100. The rectangular area 106 contains up to six holes 104 configured in a linear array with three of the holes positioned on either side of the center line of the data storage element 100.

Write Inhibit Mark

One of these holes, for example the hole labeled 6 on FIG. 1, is used to indicate the write inhibit status of the media contained within data storage element 100. This write inhibit hole is settable by the user by means of a slider 107 that can be positioned to block or open the sixth hole in the linear array of holes 104 illustrated in FIG. 1. Thus, the drive element can determine whether the files stored on this media are write inhibited by sensing whether hole 6 is blocked via the use of a photodetector positioned opposite this hole or by use of a sensing pin which probes the front surface of the data storage element 100 to determine whether the sixth or write inhibit hole is blocked by the slider 107.

Media Identification

The remaining five coding hole positions illustrated in FIG. 1 provide thirty-two possible coding configurations, since the presence or absence of a hole represents a binary data bit. Since the media is placed in the data storage element 100 by the manufacturer during the manufacturing process, the coding holes 104 are placed on the front side of the data storage element 100 during the manufacturing process to reflect the type of media located inside of housing 101. Since the 3480-type magnetic tape cartridge form factor lends itself to use with tape media, there are a number of possible configurations of media that can be used within data storage element 100. For example, the tape media can be either of a magnetic or a optical writable nature. Similarly, the data recording format used on this tape media can vary from the standard helical multi-track format used in present tape drives to the longitudinal data recording format commonly found in video tape drive elements. Additionally, the tape media can be a standard thickness or a thin tape in order to control the length of tape that can be stored on reel 105. Additional coding information can be provided by use of coding holes 104 to indicate whether the tape media contained in housing 101 is of a thick or thin dimension and, more specifically, the nominal length of tape that is provided on reel 105. Since there are a finite number of standard tape lengths, this information represents only a few possible choices and does not preclude too many of the thirty-two possible coding variations provided by coding holes 104. Additionally, the type of coating that is used on the tape media is of significance for certain drive elements and coding information can reflect whether the magnetic coating applied to the tape media is of a standard iron-oxide or chromium dioxide or barium ferrite material composition.

The coding holes 104 can reflect all of the physical characteristics of the tape media that is wound of reel 105 contained within the housing 101 of data storage element 100. In addition, the data format and content can similarly be reflected by appropriate selection of a pattern of the coding holes 104. Since the pattern of six holes illustrated in FIG. 1 represent but one embodiment of this concept, it is expected that various other configurations of coding holes are possible for use on the data storage element 100.

Coding Hole Configuration

The exact positioning and configuration of the coding holes 104 may be a function of the decoding apparatus used within the corresponding drive element in order to sense the presence or absence of the coding holes 104. In fact, the coding holes 104 need not be the round holes illustrated in FIG. 1 but can be rectangular slots cut into the front surface of housing 101 or a series of ridges embossed therein, which ridges would be mechanically sensible by a microswitch having a sensing wheel attached thereto. Finally, the rectangular area 107 can further be color coded in order to simplify identification of the media contained within the data storage element 100 by a human operator. The color coding can be a monochromatic designation that, as is illustrated in FIG. 1, completely surrounds the pattern of coding holes 104 imprinted in the front surface of housing 101. Alternatively, a series of color bars can be used to reflect the five different manufacturer supplied coding holes 104.

In order to simplify the detection of the coding holes 104, a number of mechanical configurations can be used to implement this coding scheme. In particular, a shallow circular mark can be provided in each of the five positions illustrated in FIG. 1 to indicate the location of coding holes 104. Only the coding holes that are appropriate for this particular media type would be completed, thereby enabling mechanical or optical or operator differentiation between actual holes and simply hole positions. Similarly, the hole positions can be designated by a simple target color pattern identifying a hole position. This target designation may simplify differentiation between standard 3480-type magnetic tape cartridges and universal data storage element cartridges which contain a pattern of coding holes. The rectangular area 107 that is color coded can be a pre-machined color coded insert that is integrated into the front surface of housing 101 during the manufacturing process or an area that is colored after the manufactur of housing 101.

Summary

The universal data storage element of the present invention provides a uniform media form factor of well defined exterior dimensions for a multitude of data storage media. The use of a consistent exterior housing form factor for the various types of media simplifies the data storage element storage and retrieval operation. A computer system can therefore be equipped with an automated library system or a uniform storage and retrieval system of a manual nature to handle diverse types of media. The use of the universal data storage element enables the user to store data on media that is appropriate for the nature of the data as well as provide a variable selection of drive elements for the computer system without the logistical complexities of diverse and incompatible media types. The universal data storage element supports various types of magnetic tape as well as predefined data management functions assigned to this particular media element.

While a specific embodiment of this invention has been disclosed, it is expected that those skilled in the art can and will design alternate embodiments of this invention that fall within the scope of the appended claims.

I claim:

1. A data storage cartridge, capable of housing one of a plurality of different types of data storage media said data storage cartridge capable of being inserted into a unit for reading/writing data on said data storage media, comprising:
   housing means, having predetermined exterior dimensions and having an opening in one corner thereof; and
   means, mechanically imprinted into one exterior surface of said housing means, for defining said data storage media, including a plurality of coding apertures located on said one exterior surface of said housing means.

2. The data storage cartridge of claim 1 wherein said defining means further includes:
   color coding, substantially surrounding said plurality of coding apertures located on said one exterior surface of said housing means.

3. The data storage cartridge of claim 1 wherein each of said coding apertures is settable in binary form as open/closed to identify one of a set of predefined data storage characteristics assigned to said data storage media.

4. The data storage cartridge of claim 1 wherein said coding apertures comprise a linear array of apertures located on said one exterior surface of said housing means.

5. The data storage cartridge of claim 1 wherein said data storage media comprises a tape media, and said coding apertures define a recording format used on said tape media.

6. The data storage cartridge of claim 1 wherein said data storage media comprises a tape media, and said coding apertures define a set of physical dimensions of said tape media.

7. The data storage cartridge of claim 1 wherein said data storage media comprises a tape media, and said coding apertures define a recording media composition used on said tape media.

8. The data storage cartridge of claim 1 wherein said data storage media comprises a tape media, and said coding apertures define said tape media as one of the class of tape media: magnetic, optical.

9. The data storage cartridge of claim 1 wherein said defining means comprises:
a recess of predefined dimensions in said one exterior surface of said housing means; and
means, insertable into said recess, for providing a plurality of coding apertures to define said data storage media.

10. The data storage cartridge of claim 9 wherein said defining means further comprises:
means, sandwiched between said providing means and said housing means and slidable with respect to said providing means, for enabling a user to manually define at least one of said plurality of coding apertures.

11. The data storage cartridge of claim 10 wherein said providing means includes:
a premachined block of material of exterior dimensions substantially the same as said predefined dimensions of said recess and including a recess on one side thereof to enclose at least a part of said enabling means between said providing means and said housing means.

12. The data storage cartridge of claim 9 wherein said providing means includes:
color coding, substantially surrounding said plurality of coding apertures.

13. The data storage cartridge of claim 9 wherein said plurality of coding apertures are aligned in a linear array on one exterior surface of said providing means.

14. A data storage cartridge capable of housing a single reel of magnetic tape, said data storage cartridge capable of being inserted into a tape drive for reading/writing data on said magnetic tape, comprising:
housing means, being substantially rectangular in shape, and having an opening in one corner thereof; and
means, mechanically imprinted into one exterior surface of said housing means juxtaposed to said opening, for defining said magnetic tape, including a plurality of coding apertures located on said one exterior surface of said housing means.

15. The data storage cartridge of claim 14 wherein said defining means further includes:
color coding substantially surrounding said plurality of coding apertures located on said one exterior surface of said housing means.

16. The data storage cartridge of claim 14 wherein each of said coding apertures is settable in binary form as open/closed to identify a set of predefined data storage characteristics assigned to said magnetic tape.

17. The data storage cartridge of claim 14 wherein said coding apertures comprise an array of apertures located on said one exterior surface of said housing means.

18. The data storage cartridge of claim 14 wherein said coding apertures define a magnetic recording format used on said magnetic tape.

19. The data storage cartridge of claim 14 wherein said coding apertures define a set of physical dimensions of said magnetic tape.

20. The data storage cartridge of claim 14 wherein said coding apertures define a recording media composition used on said magnetic tape.

21. The data storage cartridge of claim 14 wherein said defining means comprises:
a recess of predefined dimensions in said one exterior surface of said housing means; and
means, insertable into said recess, for providing a plurality of coding apertures to define said magnetic tape.

22. The data storage cartridge of claim 21 wherein said defining means further comprises:
means, sandwiched between said providing means and said housing means and slidable with respect to said providing means, for enabling a user to manually define at least one of said plurality of coding apertures.

23. The data storage cartridge of claim 22 wherein said providing means includes:
a premachined block of material of exterior dimensions substantially the same as said predefined dimensions of said recess and including a recess on one side thereon to enclose at least a part of said enabling means between said providing means and said housing means.

24. The data storage cartridge of claim 21 wherein said providing means includes:
color coding, substantially surrounding said plurality of coding apertures.

25. The data storage cartridge of claim 21 wherein said plurality of coding apertures are aligned in a linear array on one exterior surface of said providing means.

26. A data storage cartridge capable of housing a single reel of magnetic tape, said data storage cartridge capable of being inserted into a unit for reading/writing data on said magnetic tape, comprising:
housing means, being substantially rectangular in shape and having predetermined exterior dimensions of a 3480-type magnetic tape cartridge and an interior, and having an opening in one corner thereof;
a single reel of magnetic tape, located within said interior of said housing means;
leader block means, attached to one end of said magnetic tape, for transporting said magnetic tape from said interior of said housing means via said opening; and
means, mechanically imprinted into one exterior surface of said housing means, for defining said magnetic tape, including:
a plurality of coding apertures located on said one exterior surface of said housing means, juxtaposed to said opening,
wherein each of said coding apertures is settable in binary form as open/closed to identify a set of predefined data storage characteristics assigned to said magnetic tape.

27. The data storage cartridge of claim 26 wherein said defining means further includes:

color coding substantially surrounding said plurality of coding apertures located on said one exterior surface of said housing means.

28. The data storage cartridge of claim 26 wherein said coding apertures define a magnetic recording format used on said magnetic tape.

29. The data storage cartridge of claim 26 wherein said coding apertures define a set of physical dimensions of said magnetic tape.

30. The data storage cartridge of claim 26 wherein said coding apertures define a recording media composition used on said magnetic tape.

* * * * *